United States Patent
Heilmann et al.

(10) Patent No.: US 6,579,337 B2
(45) Date of Patent: Jun. 17, 2003

(54) REINFORCED, BENDABLE FILTER ELEMENT

(75) Inventors: Tanja Heilmann, Haan (DE); Rolf Weber, Hilden (DE); Stefan Weiss, Duesseldorf (DE)

(73) Assignee: MHB Filtration GmbH & Co. KG, Erkrath (DE)

( * ) Notice: Subject to any disclaimer, the term of this patent is extended or adjusted under 35 U.S.C. 154(b) by 44 days.

(21) Appl. No.: 09/784,339

(22) Filed: Feb. 16, 2001

(65) Prior Publication Data

US 2001/0020512 A1 Sep. 13, 2001

(30) Foreign Application Priority Data

Feb. 17, 2000 (DE) .......................................... 100 07 310

(51) Int. Cl.[7] .............................................. B01D 46/52
(52) U.S. Cl. ............................ 55/495; 55/497; 55/500; 55/502; 55/509; 55/521; 55/481
(58) Field of Search ................................ 55/385.3, 495, 55/497, 499, 500, 501, 502, 506, 509, 521, DIG. 33, DIG. 35, 481; 156/205, 210

(56) References Cited

U.S. PATENT DOCUMENTS

| 3,397,518 A | * | 8/1968 | Rogers | 55/497 |
|---|---|---|---|---|
| 3,692,184 A | * | 9/1972 | Miller et al. | 55/521 |
| 3,871,851 A | * | 3/1975 | Neumann | 55/521 |
| 5,098,767 A | * | 3/1992 | Linnersten | 55/497 |
| 5,618,324 A | * | 4/1997 | Sommer et al. | 55/497 |
| 5,792,228 A | * | 8/1998 | Fath et al. | 55/497 |
| 5,792,229 A | * | 8/1998 | Sassa et al. | 55/497 |
| 5,958,097 A | * | 9/1999 | Schlor et al. | 55/497 |
| 6,254,653 B1 | * | 7/2001 | Choi et al. | 55/497 |

FOREIGN PATENT DOCUMENTS

EP   0 867 216 A1  * 9/1998 .......... B01D/46/52

* cited by examiner

Primary Examiner—Duane Smith
Assistant Examiner—Jason M. Greene
(74) Attorney, Agent, or Firm—Crowell & Moring LLP

(57) ABSTRACT

A filter element formed of a pleated filter medium (11) and having a seal or gasket element (15) on its periphery or end faces. On one side of the filter element, which may represent either the inlet or the outlet side of the filter element, at least one adhesive track or reinforcing member (12, 13, 14), and preferably at least two adhesive tracks or reinforcing members (12, 13, 14), is/are arranged in such a way that the filter element can be bent to a curved configuration in one direction.

5 Claims, 2 Drawing Sheets

# REINFORCED, BENDABLE FILTER ELEMENT

BACKGROUND OF THE INVENTION

The invention relates to a filter element which will exhibit a desired degree of rigidity and yet is sufficiently flexible that it can be bent in one direction to a curved configuration. Such a filter element can be used to filter the fresh air supply in a motor vehicle. The filter element typically is composed of a particle filter, and if desired, may also include a supplementary activated carbon filter. It is advantageous to configure the filter element in such a way that it exhibits a high rigidity, so that it will seal reliably in the receptacle for the filter element, and so that raw or unfiltered air cannot pass around the filter to the clean air side of the filter. On the other hand there is a requirement to construct the filter element to be flexible, especially when the installation conditions are restricted, so that the filter can be assembled in its desired location in a simple manner. For this purpose various solutions are known.

SUMMARY OF THE INVENTION

It is the object of the invention to provide an improved filter element.

It is also an object of the invention to provide a filter element which is sufficiently rigid that it will seal properly in its receptacle so that raw or unfiltered air cannot bypass the filter.

An additional object of the invention is to provide a filter which is sufficiently flexible that it can be easily installed even in a restricted location.

These and other objects are achieved in accordance with the present invention by providing a filter element comprising a pleated filter medium provided on its periphery with a gasket element, further comprising at least one adhesive track or reinforcing member extending across one side of the filter medium transversely to the pleats such that the filter element is reinforced but can still be bent to a curved configuration in one direction.

In accordance with a further aspect of the invention, the objects of the invention are achieved by providing a filter apparatus comprising a housing, a filter element seated in said housing, a raw air inlet on one side of the filter element, a clean air outlet on the other side of the filter element, and a passageway for introducing the filter element into the housing, wherein the filter element is comprised of a pleated filter medium having a gasket element on its periphery, and wherein on one side of the filter medium at least one adhesive track or reinforcing member is arranged transversely to the pleats such that the filter element can be bent to a curved configuration in one direction.

The substantial advantage of the filter element according to the invention is that the pleated filter non-woven web or filter paper is provided on one side with one or more adhesive tracks or beads or other stabilizing elements, so that this side of the filter element has a high rigidity, while on the opposite side the filter element is flexible and it is possible to bend the filter element during the installation phase.

In accordance with one embodiment of the invention, adhesive tracks or reinforcing members are provided on both sides of the filter element. The difference between the reinforcing members or the adhesive tracks on the first side relative to the adhesive track on the opposite side is that the elasticity of the adhesive of the adhesive tracks is different, so that even in this case on one side a high degree of rigidity is assured and on the other side a high resilience or elasticity.

An alternative embodiment envisions adjusting the strength of the adhesive track in accordance with the required elasticity or stability of the filter.

One advantageous use of the filter element is for filtering air for the passenger compartment of a motor vehicle. For this purpose the filter element is inserted into a receptacle above a passageway. While in this receptacle, raw air flows through the filter element and is cleaned, and the clean air is guided by the shaft or duct to the passenger compartment of the motor vehicle.

It is well known that the space available for installing devices in motor vehicles is very limited. For this reason, the filter element is guided to its position through a curved passageway. In order to successfully pass through this curved passageway, the filter element must adapt to the curvature. It is therefore necessary that the filter element be deformable. On the other hand, a high degree of rigidity must be assured, so that the filter element can be pushed into position through the installation shaft or duct and so that it will seal properly when installed in place in its receptacle.

These and further features of preferred embodiments of the invention are found not only in the claims, but also in the description and the drawings, and the respective features can be realized individually or jointly in the form of subcombinations in embodiments of the invention and in other fields of use, and may represent advantageous and independently protectible embodiments, for which protection is also claimed.

BRIEF DESCRIPTION OF THE DRAWINGS

The invention will be explained in further detail hereinafter with reference to illustrative working embodiments shown in the accompanying drawing figures in which.

DETAILED DESCRIPTION OF PREFERRED EMBODIMENTS

Figure 1:
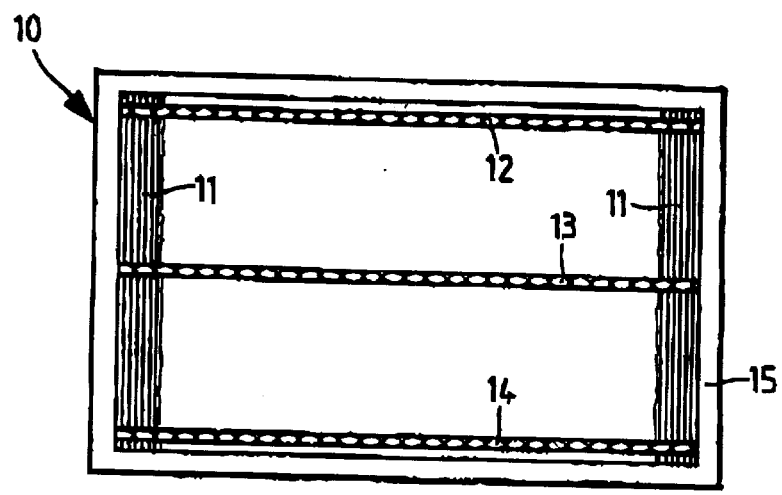
FIG. 1 shows a plan view of a flexible filter element according to the invention.

The filter element 10 according to FIG. 1 is comprised of a pleated non-woven web 11 and is constructed with a substantially rectangular configuration. On the upper side of the filter element 10, three adhesive tracks or beads 12, 13 and 14 are arranged. In one preferred embodiment, these reinforcing members are formed by applying a continuous bead of a hot melt adhesive across the filter element transversely to the direction of the pleats. The hot melt adhesive is soft when applied, but afterward cools and sets up. The resulting cooled bead of adhesive is sufficiently rigid to hold the filter generally flat, but also sufficiently pliable that the filter can be bent to a curved configuration in which the pleats on the opposite side of the filter element from the bead are compressed or expanded, depending on the direction of bending.

In order to seal the filter element at its sides, a seal or gasket 15 can be affixed to the periphery of the filter element. This seal or gasket 15 can be composed of a foam material or of the material of the filter element. Seal member 15 may be adhesively bonded to the periphery of the filter, or alternatively it could be molded around the periphery of the filter medium.

Figure 2:
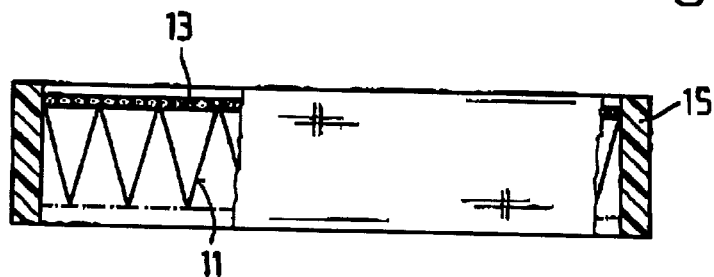
FIG. 2 shows a side view of the filter element.

FIG. 2 shows a side view of the filter element with the seal or gasket 15, the adhesive track or bead 13 and the pleated non-woven web 11. It can be seen that the filter element has a high longitudinal rigidity as a result of the adhesive track on its upper side. On the opposite side the open pleats are both compressible and also stretchable or expandable, so that the filter element is deformable. This means that the filter element can be bent to a curved configuration without difficulty.

Figure 3:
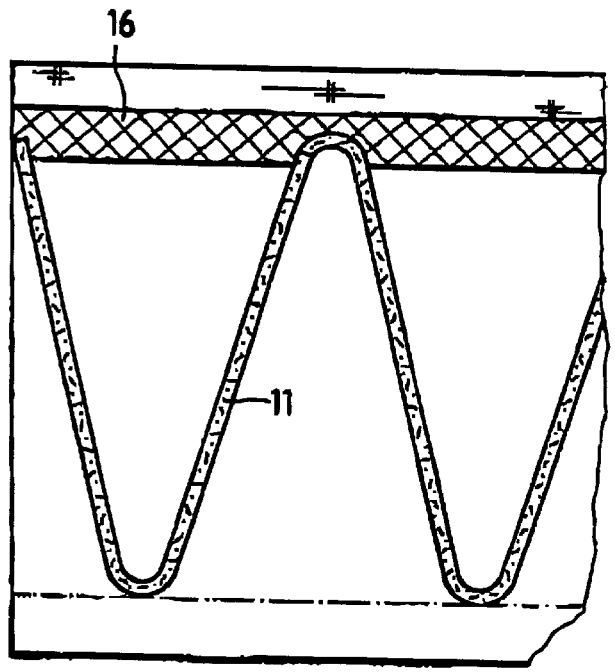
FIG. 3 shows a detail illustration from the side view.

FIG. 3 shows a detail view. Instead of the adhesive track or bead 13, in this case a stabilizing band 16, such as a cardboard strip, is adhesively bonded to the pleated folds of the non-woven web 11. This stabilizing band also serves to achieve a high degree of longitudinal stability.

Figure 4:
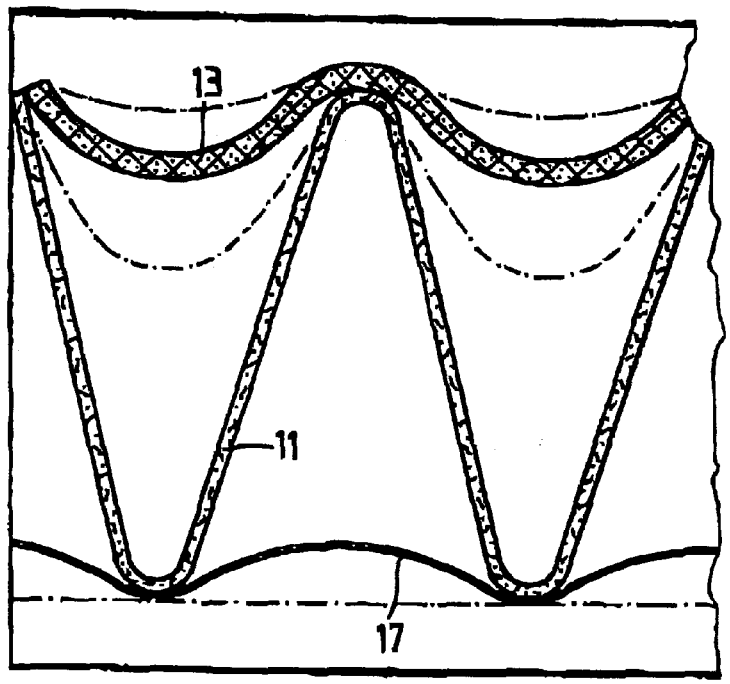
FIG. 4 shows a detail view of a variant embodiment.

FIG. 4 shows a detail illustration of an adhesive track or bead 13 on the non-woven web 11. The adhesive track is composed of a hot melt adhesive which is applied to the folds during production of the pleated filter. Due to the elasticity of the hot melt adhesive in the molten state, the track or bead of adhesive sags or stretches part way into the folds. As a result of this penetration into the folds, a further increase of stability of the pleated filter is achieved. Preferably, the adhesive tracks penetrate into the pleat folds up to a maximum of 30% of the overall pleat depth. By varying or controlling the amount and the stiffness of the adhesive track, the stability of the filter can be adjusted or optimized.

On the underside of the pleated non-woven web 11 a second adhesive track 17 is likewise arranged. However, this second adhesive track 17 has a substantially smaller cross-section and is thus highly elastic. This adhesive track 17 achieves a certain stability of the pleated filter, but on the other hand the pleats remain compressible or stretchable to a certain extent.

Figure 5:
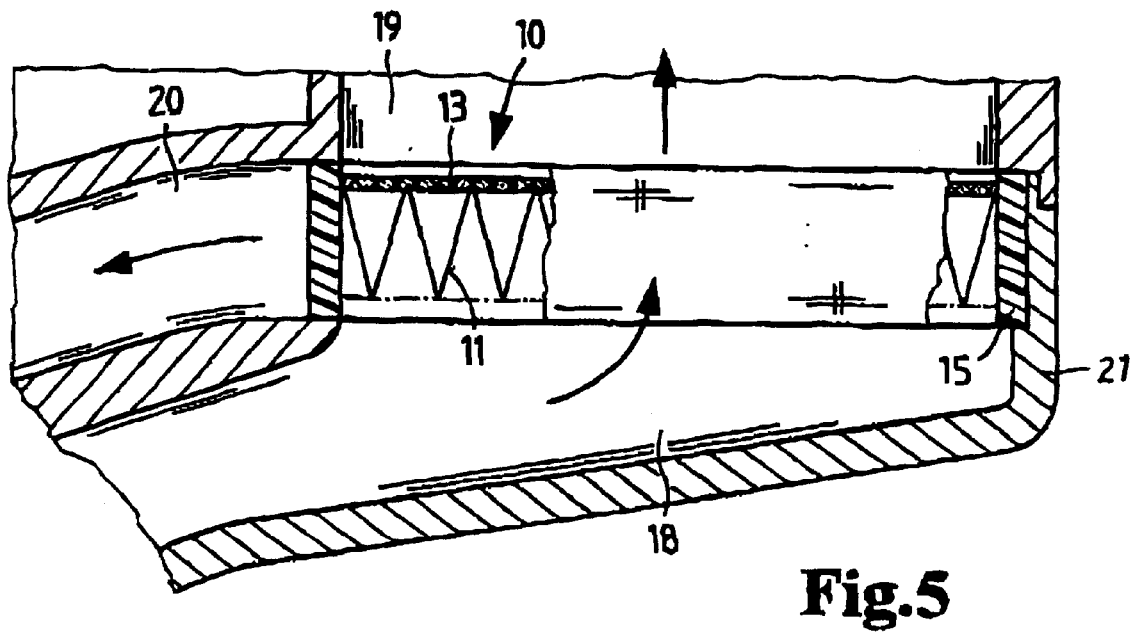
FIG. 5 shows the situation of a filter element installed in a housing.

FIG. 5 shows the situation of an installed filter element in a motor vehicle. A housing 21 is provided which has a supply duct 18 for the unfiltered air. The filter element 10 is arranged in this duct and serves to filter the raw air. The filtered air flows upwardly through the clean air duct 19 and is conducted to a motor vehicle passenger compartment (not shown).

To facilitate exchange of the filter element 10, an installation passageway 20 is shown. Due to the limited space available, this passageway has a curved structure. When the filter element is exchanged, it must be pulled out through this passageway, and a new filter element must be inserted through passageway. Because of the one-sided elasticity of the filter elements it is possible without difficulty to pass the filter through the curved passageway 20. Nevertheless, the filter element retains sufficient rigidity to seal properly in installed position in housing 21.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A filter element comprising a pleated filter medium provided on its periphery with a gasket element, further comprising at least one adhesive track or reinforcing member extending across a first side of the filter medium transversely to the pleats such that the filter element is reinforced but can still be bent to a curved configuration in one direction, further comprising at least one adhesive track extending across a second side of the filter medium transversely to the pleats, wherein said at least one adhesive track extending across the second side has an elasticity different from that of the at least one adhesive track extending across the first side.

2. A filter element according to claim 1, comprising at least two adhesive tracks extending across the second side of the filter medium.

3. A filter element according to claim 1, wherein the rigidity of the adhesive tracks is adjustable to correspond to the required deformability or stability of the filter.

4. A filter apparatus comprising a housing, a filter element seated in said housing, a raw air inlet on a first side of the filter element, a clean air outlet on a second side of the filter element, and a curved passageway for introducing the filter element into the housing, wherein the filter element is comprised of a pleated filter medium having a gasket element on its periphery, and wherein on the first side of the filter medium at least one adhesive track or reinforcing member is arranged transversely to the pleats such that the filter element can be bent to a curved configuration in one direction for introduction into the housing through the curved passageway, wherein the filter element includes at least one adhesive track extending across the second side of the filter medium transversely to the pleats, wherein said at least one adhesive track extending across the second side has an elasticity different from that of the at least one adhesive track extending across the first side.

5. An apparatus according to claim 4, wherein the rigidity of the adhesive tracks is adjustable to correspond to the required deformability or stability of the filter.

\* \* \* \* \*